United States Patent [19]

Manning et al.

[11] Patent Number: 5,147,833
[45] Date of Patent: Sep. 15, 1992

[54] ALUMINA-ZIRCONIA CERAMIC

[75] Inventors: William R. Manning, Richmond, Mich.; Terrence K. Brog, Littleton, Colo.

[73] Assignee: Champion Spark Plug Company, Toledo, Ohio

[21] Appl. No.: 682,852

[22] Filed: Apr. 5, 1991

Related U.S. Application Data

[63] Continuation of Ser. No. 399,143, Aug. 28, 1989, abandoned, which is a continuation-in-part of Ser. No. 287,693, Dec. 20, 1988, abandoned, which is a continuation of Ser. No. 76,439, Jul. 22, 1987, abandoned.

[51] Int. Cl.$^5$ .................... C04B 35/10; C04B 35/48; C04B 35/49
[52] U.S. Cl. ................................... 501/105
[58] Field of Search ......................... 501/105

[56] References Cited

U.S. PATENT DOCUMENTS 3,916,585 11/1975 Barks .................................. 501/105
4,760,038 7/1988 Kinney, Jr. et al. ................ 501/105

Primary Examiner—Mark L. Bell
Attorney, Agent, or Firm—John C. Purdue; David C. Purdue

[57] ABSTRACT

A ceramic article is disclosed. The article is composed of from 6 to 50 percent of particulate $ZrO_2$ having an ultimate particle size less than 2 µm, from 50 to 94 percent of particulate $Al_2O_3$, from ¼ to 3 percent of $MnO_2$ and from ¼ to 3 percent of $TiO_2$.

7 Claims, No Drawings

ALUMINA-ZIRCONIA CERAMIC

REFERENCE TO RELATED APPLICATION

This is a continuation of application Ser. No. 07/399,143, filed Aug. 28, 1989, itself a continuation in part of application Ser. No. 287,693 filed Dec. 20, 1988 as a continuation of application Ser. No. 076,439, filed Jul. 22, 1987, all now abandoned.

DEFINITIONS

As used herein, and in the appended claims, the terms "percent" and "parts" refer to percent and parts by weight, unless otherwise indicated; g means gram or grams; cm means centimeter or centimeters; $\mu$m means micrometer or micrometers; mm means millimeter or millimeters; m/o means mole percent, and equals 100 times the number of moles of the constituent designated in a composition divided by the total number of moles in the composition; psi means pounds per square inch; and MPa means $10^6$ Pascals.

All temperatures herein are in degrees C., unless otherwise indicated; all modulus of rupture data are in psi and are rounded to the nearest 50 psi; and all standard deviations herein are rounded to the nearest 50psi. All particle size data herein, unless otherwise indicated, are based upon measurements made on an instrument that is commercially available from Leeds & Northrup under the trade designation MICROTRAC SMALL PARTICLE ANALYZER.

BACKGROUND OF THE INVENTION

1. Field of the Invention

This invention relates to an alumina ceramic containing additions of $MnO_2$ and $TiO_2$ and of zirconia, of yttria-stabilized zirconia or of both; the ceramic can be one in which particles of zirconia and yttria-stabilized zirconia are in the metastable tetragonal or monoclinic crystal structure, or in both structures.

2. The Prior Art

Various alumina ceramics with additions of zirconia have been suggested. For example, U.S. Pat. No. 4,298,385, Claussen, discloses that additions of zirconia or hafnia to alumina increase the fracture toughness. It has been found, however, that, at high zirconia contents, it is difficult to retain a sufficient amount of the zirconia in the metastable tetragonal structure, and that the zirconia particles must be smaller than 0.5 $\mu$m.

Another U.S. Pat. No. 4,316,964, Lange, discloses alumina ceramics with additions of zirconia, which can be stabilized with one or more of $Y_2O_3$, $CeO_2$, $La_2O_3$, and $Er_2O_3$ for the purpose of stabilizing a reasonable amount of the zirconia in the metastable tetragonal symmetry.

Still another U.S. Pat., No. 4,533,647, Tien, discloses modified alumina-zirconia composites. In one modification, chromia is present in solid solution in the alumina to increase the hardness and elastic modulus of the "matrix". In another modification, hafnia is used with the zirconia for the purpose of increasing the temperature at which the tetragonal to monoclinic transformation occurs, and, supposedly, as a consequence, to increase the fracture toughness, although it was found later that the increase in fracture toughness does not necessarily occur.

Further, U.S. Pat. No. 4,552,852, Manning, discloses alumina ceramics with zirconia or hafnia additions and a glass-phase. The material shows an improvement in thermal shock resistance.

Also, U.S. Pat. No. 4,587,225, Tsukuma, discloses composite ceramics of alumina and zirconia to which yttria additions have been made. The ceramic is produced by hot pressing, which enables the use of both lower temperatures and shorter times than would otherwise be required. This patent claims a high-strength material which is probably achieved, in part, as a consequence of the hot pressing.

A high strength metal working tool is disclosed by U.S. Pat. No. 4,666,467, Matsumoto et al. The tool is made from a sintered material comprising 50 to 98 percent of zirconia containing 1.5 to 5 m/o of yttria and 50 to 2 percent of alumina or spinel.

A method for producing zirconia bodies partially stabilized with yttria and including a secondary stabilized phase is disclosed by U.S. Pat. No. 4,659,680, Guile. The method involves sintering a shaped batch, cooling the shape quickly to a temperature within the range of 1000° to 1475°, holding the shape at a temperature within the indicated range to cause precipitation of tetragonal $ZrO_2$ as islands within cubic $ZrO_2$ grains, and cooling to room temperature.

In addition, a fired ceramic material consisting essentially of $Al_2O_3$ as the principal ingredient, 5-35 percent of $ZrO_2$ as a first additive, and 0.25-5 percent of $TiO_2$ and $MnO_2$ as second and third additives, is disclosed by U.S. Pat. No. 4,760,038, Kinney et al. The additives, the reference states, "increase the thermal shock resistance of the fired ceramic composition, with retention of elevated temperature strength properties." (lines 7 and following of the abstract)

Further, Cutler, Bradshaw, Christensen and Hyatt have disclosed that 96 percent alumina bodies containing small additions of $MnO_2$ and $TiO_2$ have been produced at sintering temperatures in the range of 1300° to 1400°, Journal of the American Ceramic Society, Volume 40, No. 4, April, 1957, pages 134 et seq.

Finally, U.S. Pat. No. 3,686,007, Gion, discloses the use of a mixture of $TiO_2$ and $MnO_2$ as a flux in alumina ceramics containing relatively large amounts of ball clay and feldspar.

SUMMARY OF THE INVENTION

The instant invention is based upon the discovery of a ceramic which consists essentially of from 6 to 50 percent of particulate $ZrO_2$ having an ultimate particle size less than 2 $\mu$m, from 50 to 94 percent of particulate $Al_2O_3$ from ¼ to 3 percent of $MnO_2$ and from ¼ to 3 percent of $TiO_2$. The particulates are bonded to one another by sintering to form a dense, gas impervious structure. The ceramic is produced by comminuting a batch having the indicated composition, compacting the comminuted batch into a shape, and firing the shape. Yttria and other rare earth oxides can be used to stabilize all or, preferably, a part of the $ZrO_2$ in a tetragonal crystal structure; it is usually preferred that $Y_2O_3$ be used for stabilization, and about the minimum amount that is required. While approximately 9 percent of $Y_2O_3$ is required for complete stabilization of $ZrO_2$, it has been found that $ZrO_2$ stabilized with as little as 5 percent of $Y_2O_3$ is significantly advantageous in a ceramic according to the invention. All of the particulates should have an ultimate particle size finer than 15 $\mu$m and the $ZrO_2$, particulates, as is indicated above, should have an ultimate particle size finer than 2 $\mu$m for it to be possible for the ceramic to have improved strength as a consequence of the presence of the $ZrO_2$.

Available data indicate that, if a suitably lowered firing temperature is used, a large increase in strength as measured by the modulus of rupture is achieved when small additions of $MnO_2$ and $TiO_2$ are made to alumina ceramics containing from 6 to 50 percent of $ZrO_2$ having an ultimate particle size less than 2 μm and that the $ZrO_2$ can be monoclinic, metastable tetragonal $ZrO_2$, or mixtures of the two.

DESCRIPTION OF THE PREFERRED EMBODIMENTS

The following examples are presented solely for the purpose of further illustrating and disclosing the invention. They are to be construed as illustrative, and not as limiting. Example 1 constitutes the best mode presently contemplated by the inventors.

EXAMPLE 1

A ceramic batch composed of 79.2 parts of $Al_2O_3$, 20.8 parts $ZrO_2$ stabilized with $Y_2O_3$, 1 part of a 50 percent $MnO_2$-50 percent $TiO_2$ mixture, 4 parts of a binder that is commercially available under the trade designation Mobilcer X and 0.4 part of a dispersant that is commercially available under the trade designation Darvan C was wet milled at 67 percent solids for one hour. The resulting batch was dried to a powder under an infra red lamp; the powder was then sieved twice, first through a 20 mesh screen and then through a 60 mesh screen. The sieved batch was then pressed isostatically at 5000 psi. (about 35 MPa) around a cylindrical mandrel which had a diameter of about 4.8 mm, and the pressed shape was calcined at 871° for one hour; the calcined shape was rotated and ground by contact with a rotating grinding wheel to produce a stepped cylindrical blank with an internal bore which had a diameter of about 4.6 mm, a stem portion which had a length of about 59.9 cm and a diameter of about 9.2 mm, and a base portion which had a length of about 5.5 mm and a diameter of about 18.4 mm. The ground piece was then placed on a setter and fired in an electric laboratory furnace in an air atmosphere; the firing cycle involved heating in about two hours from 20° to 1350°, 3 hours at 1350°, and cooling. The fired ceramic which resulted had an internal bore about 4 mm in diameter and an overall length of 57 mm; the stem portion had a length of 53 mm and an outside diameter of 6.6 mm, while the base portion had a length of 4 mm and an outside diameter of 14.3 mm. A batch of 12 ceramic pieces produced as described in this Example was found to have a modulus of rupture measured in three point loading of 65219 psi.

The $ZrO_2$ stabilized with $Y_2O_3$ used as described above in Example 1 (hereafter "$ZrO_2S$") was produced by wet milling for 10 hours and drying a grade of zirconia that is commercially available from Zirconia Sales, America, under the trade designation HSY-3. The material has a median particle size of about 2.3 μm, as received, 1.2 μm after the ten hour milling described above; the grade HSY-3 zirconia consists of $ZrO_2$ plus 3 m/o $Y_2O_3$, assay 99.3 percent, and incidental impurities.

The $Al_2O_3$ used as described above in Example 1 is commercially available from Reynolds International, Inc. under the designation RC-HP-DBM. The supplier specifies that the material has a median ultimate particle size of about 0.6 μm; it consists of $Al_2O_3$, assay 99.5 percent, 0.05 percent MgO and incidental impurities.

The $MnO_2$ and the $TiO_2$ used as described above in Example 1 are reagent grade chemicals, available from J. T. Baker Chemical Company.

The binder used as described above in Example 1 is a microcrystalline wax emulsion commercially available from Mobil Oil Corporation under the trade designation Mobilcer X.

The Darvan C dispersant used as described above in Example 1 is an ammonium polyelectrolyte commercially available from R. T. Vanderbilt Company, Inc.

For purposes of comparison, but not in accordance with the instant invention, the procedure of Example 1 was repeated, except that the batch was composed of 100.0 parts of $Al_2O_3$, 1 part of the 50 percent $MnO_2$-50 percent $TiO_2$ mixture, 4 parts of the Mobilcer X binder and 0.4 part of the Darvan C dispersant. The modulus of rupture of the samples, measured in three point loading, was found to be 54,650 psi.

EXAMPLES 2 AND 3

The procedure of Example 1 was repeated to produce other ceramics according to the invention, using different zirconias. The identities of the zirconias used, monoclinic zirconia being designated "$ZrO_2m$", and the modulus of rupture of the ceramics produced are set forth in the following table:

|  | $ZrO_2m$ | $ZrO_2s$ | MOR, psi |
| --- | --- | --- | --- |
| Example 2 | 10.4 | 10.4 | 74500 |
| 3 | 20.8 | 0.0 | 64400 |

The monoclinic zirconia used as described above in Examples 2 and 3 is commercially available from Zirconia Sales, America, under the trade designation DK-1. The material has a median particle size of about 2.9 μm as received, and a median particle size of about 1.2 μm after the ten hour wet milling.

EXAMPLES 4-6

The procedure of Examples 1-3, except that the powder was pressed at 8000 psi, was used to produce additional samples according to the invention. The identity of the zirconia component of each batch, and the modulus of rupture of each of the sets of samples are set forth in the following table:

|  | $ZrO_2m$ | $ZrO_2s$ | MOR, psi |
| --- | --- | --- | --- |
| Example 4 | 0.0 | 20.8 | 74100 |
| 5 | 10.4 | 10.4 | 82600 |
| 6 | 20.8 | 0.0 | 69900 |

The procedure of Examples 1-3 was also used to make a systematic investigation of modulus of rupture as a function of composition, firing temperature, percent of $MnO_2$ and $TiO_2$ used, and proportions of $ZrO_2s$ and $ZrO_2m$. The results of this investigation are set forth in Tables I through IX, below, where, with reference to modulus of rupture, M refers to the mean, SD to the standard deviation, and Number to the size of the sample. In all cases, the batch was composed of 79.2 parts of $Al_2O_3$, 20.8 parts of $ZrO_2$, and an amount of a 50 percent $MnO_2$—50 percent $TiO_2$ mixture sufficient to provide the concentration thereof reported ("MT"), and contained 4 percent of the Mobilcer X binder and 0.4 percent of the Darvan C dispersant. The data in each of Tables I-IX are for pieces fired to a single temperature, which is indicated parenthetically after the table number.

TABLE I
(1300°)

| Example | ZrO₂m | ZrO₂s | MT | Modulus of Rupture | | |
|---|---|---|---|---|---|---|
| | | | | M | SD | Number |
| 7 | 10.4 | 10.4 | 1.0 | 58650 | 3800 | 8 |
| 8 | 5.2 | 15.6 | 1.0 | 49450 | 5600 | 10 |
| 9 | 2.6 | 18.2 | 1.0 | 48200 | 5450 | 10 |
| 10 | 0.0 | 20.8 | 1.0 | 49050 | 4000 | 10 |
| 11 | 20.8 | 0.0 | 1.0 | 57800 | 3650 | 10 |

TABLE II
(1350°)

| Example | ZrO₂m | ZrO₂s | MT | Modulus of Rupture | | |
|---|---|---|---|---|---|---|
| | | | | M | SD | Number |
| 12 | 10.4 | 10.4 | 1.0 | 73850 | 3400 | 10 |
| 13 | 5.2 | 15.6 | 1.0 | 63750 | 4200 | 10 |
| 14 | 2.6 | 18.2 | 1.0 | 59350 | 3350 | 9 |
| 15 | 0.0 | 20.8 | 1.0 | 51500 | 4750 | 10 |
| 16 | 20.8 | 0.0 | 1.0 | 71900 | 545 | 9 |

TABLE III
(1400°)

| Example | ZrO₂m | ZrO₂s | MT | Modulus of Rupture | | |
|---|---|---|---|---|---|---|
| | | | | M | SD | Number |
| 17 | 10.4 | 10.4 | 1.0 | 77900 | 8700 | 10 |
| 18 | 5.2 | 15.6 | 1.0 | 74200 | 8250 | 10 |
| 19 | 2.6 | 18.2 | 1.0 | 71200 | 5900 | 10 |
| 20 | 0.0 | 20.8 | 1.0 | 65950 | 7450 | 10 |
| 21 | 20.8 | 0.0 | 1.0 | 55300 | 1500 | 10 |

TABLE IV
(1450°)

| Example | ZrO₂m | ZrO₂s | MT | Modulus of Rupture | | |
|---|---|---|---|---|---|---|
| | | | | M | SD | Number |
| 22 | 10.4 | 10.4 | 1.0 | 73150 | 7400 | 10 |
| 23 | 5.2 | 15.6 | 1.0 | 73900 | 8650 | 10 |
| 24 | 2.6 | 18.2 | 1.0 | 72900 | 9100 | 11 |
| 25 | 0.0 | 20.8 | 1.0 | 69750 | 5350 | 10 |
| 26 | 20.8 | 0.0 | 1.0 | 49000 | 1850 | 10 |

TABLE V
(1250°)

| Example | ZrO₂m | ZrO₂s | MT | Modulus of Rupture | | |
|---|---|---|---|---|---|---|
| | | | | M | SD | Number |
| 27 | 10.4 | 10.4 | 2.0 | 51150 | 5550 | 10 |
| 28 | 10.4 | 10.4 | 4.0 | 51400 | 6400 | 10 |

TABLE VI
(1300°)

| Example | ZrO₂m | ZrO₂s | MT | Modulus of Rupture | | |
|---|---|---|---|---|---|---|
| | | | | M | SD | Number |
| Control | 10.4 | 10.4 | 0.0 | 13600 | 1600 | 12 |
| 29 | 10.4 | 10.4 | 0.5 | 30750 | 3200 | 12 |
| 30 | 10.4 | 10.4 | 1.0 | 58950 | 7150 | 12 |
| 31 | 10.4 | 10.4 | 2.0 | 70900 | 7400 | 12 |
| 32 | 10.4 | 10.4 | 4.0 | 65500 | 6000 | 12 |

TABLE VII
(1400°)

| Example | ZrO₂m | ZrO₂s | MT | Modulus of Rupture | | |
|---|---|---|---|---|---|---|
| | | | | M | SD | Number |
| Control | 10.4 | 10.4 | 0.0 | 41650 | 5450 | 9 |
| 33 | 10.4 | 10.4 | 0.5 | 59750 | 3850 | 10 |
| 34 | 10.4 | 10.4 | 1.0 | 82000 | 3900 | 13 |
| 35 | 10.4 | 10.4 | 2.0 | 74400 | 4550 | 11 |
| 36 | 10.4 | 10.4 | 4.0 | 40050 | 2350 | 12 |

TABLE VIII
(1500°)

| Example | ZrO₂m | ZrO₂s | MT | Modulus of Rupture | | |
|---|---|---|---|---|---|---|
| | | | | M | SD | Number |
| Control | 10.4 | 10.4 | 0.0 | 82000 | 5850 | 12 |
| 37 | 10.4 | 10.4 | 0.5 | 84900 | 5500 | 12 |
| 38 | 10.4 | 10.4 | 1.0 | 74750 | 9300 | 12 |
| 39 | 10.4 | 10.4 | 2.0 | 24650 | 2300 | 11 |
| 40 | 10.4 | 10.4 | 4.0 | 20200 | 2450 | 12 |

TABLE IX
(1550°)

| Example | ZrO₂m | ZrO₂s | MT | Modulus of Rupture | | |
|---|---|---|---|---|---|---|
| | | | | M | SD | Number |
| Control | 10.4 | 10.4 | 0.0 | 71750 | 5700 | 11 |
| 41 | 10.4 | 10.4 | 0.5 | 85850 | 6550 | 10 |
| 42 | 10.4 | 10.4 | 1.0 | 46750 | 4700 | 10 |

The data of the foregoing examples demonstrates that additions of from 0.5 to 4 percent of $MnO_2$-$TiO_2$ strengthened significantly the samples according to the invention, some of which contained tetragonal $ZrO_2$, some of which contained $ZrO_2$ stabilized with Yttria, and some of which contained a mixture of the two; in all cases, the ultimate particle size of the zirconia was less than 2 μm. In retrospect, it is believed that part of this strengthening is a consequence of the lowering, attributable to the $MnO_2$-$TiO_2$, of the firing temperature required to produce the samples, and the consequent minimizing of $ZrO_2$ grain growth during firing. Ceramics according to the instant invention consist essentially of from 6 to 50 percent of particulate $ZrO_2$ having an ultimate particle size less than 2 μm, from 50 to 94 percent of particulate $Al_2O_2$ from ¼ to 3¾ percent of $MnO_2$ and from ¼ to 3¾ percent of $TiO_2$. Preferably, the $MnO_2$ and the $TiO_2$ are present in approximately equal proportions and constitute, together, from about 1 to about 3 percent of the ceramic. As a practical matter, ceramics according to the invention can be produced only from chemically produced zirconias, because the naturally occurring materials are all too large in ultimate particle size. Over firing should be avoided in producing ceramics according to the invention because grain growth which occurs when zirconia particles are heated to temperatures above about 1400° will increase the ultimate zirconia particle size enough to affect disadvantageously the strength of the ceramic.

It will be apparent that various changes and modifications can be made from the details of the invention as specifically disclosed herein without departing from the spirit and scope thereof as defined in the appended claims.

We claim:

1. A ceramic article produced by firing a shape pressed from a ceramic batch which consists of from 6 to 50 percent of particulate $ZrO_2$ having an ultimate particle size less than 2 μm, from 50 to 94 percent of particulate Al$_2$O$_3$, from ¼ to 3 percent of MnO$_2$ and from ¼ to 3 percent of TiO$_2$ to a temperature sufficiently high to mature the ceramic but not sufficiently high to cause a degradation of the strength thereof.

2. A ceramic article as claimed in claim 1 wherein from 40 to 60 percent of the particulate ZrO$_2$ in the batch is in a metastable tetragonal crystal structure and from 60 to 40 percent thereof has no monoclinic structure.

3. A ceramic article produced by firing a shape pressed from a ceramic batch which consists essentially of from 15 to 25 percent of particulate ZrO$_2$ having an ultimate particle size less than 2 μm, from 75 to 85 percent of particulate Al$_2$O$_3$, from ¼ to 3 percent of MnO$_2$ and from ¼ to 3 percent TiO$_2$.

4. A ceramic article as claimed in claim 1 wherein the batch contains from ½ to 2 percent each of MnO$_2$ and TiO$_2$.

5. A ceramic article as claimed in claim 4 wherein from 40 to 60 percent of the particulate ZrO$_2$ in the batch is in a metastable tetragonal crystal structure and from 60 to 40 percent thereof has a monoclinic structure.

6. A ceramic article as claimed in claim 3 wherein the MnO$_2$ and the TiO$_2$ are present in substantially equal proportions in the batch.

7. A ceramic article as claimed in claim 6 wherein from 40 to 60 percent of the particulate ZrO$_2$ in the batch is in a metastable tetragonal crystal structure and from 60 to 40 percent thereof has a monoclinic structure.

* * * * *

UNITED STATES PATENT AND TRADEMARK OFFICE
CERTIFICATE OF CORRECTION

PATENT NO. : 5,147,833
DATED : September 15, 1992
INVENTOR(S) : Manning et al.

It is certified that error appears in the above-identified patent and that said Letters Patent is hereby corrected as shown below:

Column 3, Line 55 should read above in Example 1 (hereafter "$ZrO_2s$") was produced Column 6, Line 45 should read cent of particulate $Al_2O_3$ from 1/4 to 3 3/4 percent on $MnO_2$ Column 6, Line 66 should read pressed from a ceramic batch which consists essentially of from 6

Signed and Sealed this

Thirtieth Day of March, 1993

*Attest:*

STEPHEN G. KUNIN

*Attesting Officer*     *Acting Commissioner of Patents and Trademarks*